April 21, 1964 R. R. COSNER 3,129,583
EXTENSOMETER FOR TENSILE TESTING OF NON-RIGID MATERIALS
Filed June 10, 1960 4 Sheets-Sheet 1

INVENTOR.
ROBERT R. COSNER
BY Howard K. Kothe
ATTORNEY

April 21, 1964 R. R. COSNER 3,129,583
EXTENSOMETER FOR TENSILE TESTING OF NON-RIGID MATERIALS
Filed June 10, 1960 4 Sheets-Sheet 2

INVENTOR.
ROBERT R. COSNER
BY Howard K. Kotler
ATTORNEY

April 21, 1964 R. R. COSNER 3,129,583
EXTENSOMETER FOR TENSILE TESTING OF NON-RIGID MATERIALS
Filed June 10, 1960 4 Sheets-Sheet 3

INVENTOR.
ROBERT R. COSNER
BY Howard K. Kothe
ATTORNEY

April 21, 1964 R. R. COSNER 3,129,583
EXTENSOMETER FOR TENSILE TESTING OF NON-RIGID MATERIALS
Filed June 10, 1960 4 Sheets-Sheet 4

INVENTOR
ROBERT R. COSNER
BY Maurice W. Ryan
ATTORNEY

United States Patent Office 3,129,583
Patented Apr. 21, 1964

1

3,129,583
EXTENSOMETER FOR TENSILE TESTING OF
NON-RIGID MATERIALS
Robert R. Cosner, South Charleston, W. Va., assignor to
Union Carbide Corporation, a corporation of New
York
Filed June 10, 1960, Ser. No. 35,218
4 Claims. (Cl. 73—89)

The present invention relates to apparatus for measuring strain in materials under stress and more particularly to apparatus for use with presently available materials testing machines which permits continuous and accurate determination of strain as a function of stress in tensionally loaded extensible materials at a preselected location on the sample being elongated.

Strain measurements are most frequently correlated to stress applied to the specimen under test. The test data takes the form of a stress-strain diagram in which the stress per unit cross-sectional area of the specimen loaded axially in tension is plotted as ordinate values and unit or percent strain is plotted as abscissa values on rectilinear coordinate axes.

Unit strain may be obtained by dividing the incremental elongation of a unit length of the specimen under test by the original unit length. One of the earliest and most elementary methods for strain measurement comprises marking the unloaded specimen at the end points of a selected unit length, measuring the distance between the marks from time to time as the sample is elongated and calculating the strain by subtracting the original unit length from the measured length and dividing the remainder by the original unit length. This method obviously lacks continuity and is liable to error through its dependence on subjective interpretation of the measurements by the human tester. Various types of strain gages adapted for clamping or pinpoint attachment to the sample are also available for strain measurement but it is obvious that attachment to or support from the specimen being tested causes biaxial stresses or rupture of the integrity of the specimen's surface which will cause aberrations in the test data. This is an effect particularly salient in the case of the elastomeric materials such as rubber and the like.

Presently available roller-type extensometers, supported independently of the specimen undergoing test, overcome many of the difficulties experienced with older test methods and apparatus but up to the time of the present invention no completely satisfactory extensometer has been available for strain testing the more elastic materials. For example, no known roller-type extensometer is adapted to maintain its position relative to the sample between the fixed and moving jaws of the tensile testing apparatus. Also, in the use of known extensometers, the data sensed and indicated must be correlated with the strain-inducing stress by the person performing the test, thus introducing the possibility of human error.

In the present invention, a differential gearing arrangement is provided to maintain the contact portion of the extensometer in the same position relative to the sample, during movement of the tensile testing apparatus. In addition, the present invention eliminates the possibility of human error in data correlation by automatically correlating the stress versus strain test data during the entire performance of the test through the use of a closed loop electrical servomechanism system.

In general, the present invention comprises, in combination, a rolling contact-type extensometer assembly on a pair of gear rack support members, with one of a pair of measuring rollers operably connected to drive a first electrical servomechanism transmitter unit and the other of said pair of measuring rollers connected to the rotor of an electrical servomechanism differential unit. The measuring rollers are maintained in surface contact with the material undergoing elongation by idler rollers and a first signal, generated in said electrical servomechanism units and corresponding to the sum of the rotational movements of the rollers, is applied as input to an error signal amplifier in opposed voltage relationship to a second electrical servomechanism transmitted unit driven by the recorder chart drive motor. The error signal amplifier output is used to control the velocity of the recorder chart drive motor. In the manner, the velocity of the recorder chart drive is made to correspond to the straining rate of the specimen being tested and, as a consequence, each abscissa value on the record chart corresponds to an experienced strain.

The subject invention can be used in cooperation with any standard commercially available tensile testing machine of the movable crosshead type, having included therein load sensing means and test data recording means with a drive adaptable to control by an error signal from an electrical servomechanism system or, alternatively, in cooperation with the same apparatus embodied in separate testing and recording components. By maintaining the recorder chart drive at a velocity corresponding to the straining velocity in the test specimen, and driving the recorder marker with the output of the tensile tester's load sensing means, an accurate stress-strain diagram is automatically plotted during the test.

Further understanding of the present invention will be facilitated by the ensuing detailed description and the drawings wherein.

Figure 1:
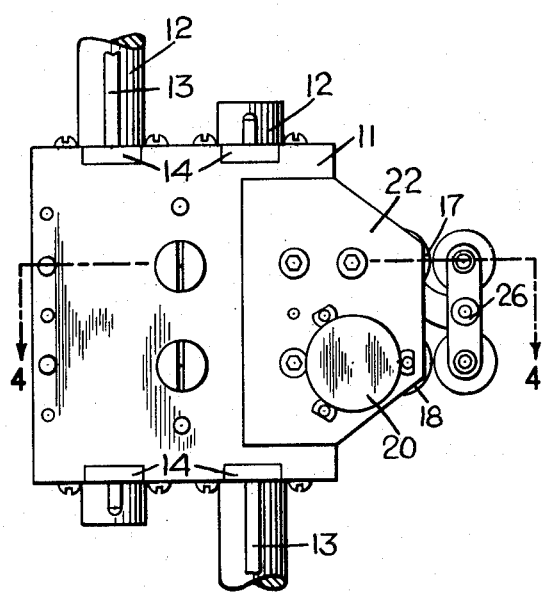
FIGURE 1 is a side view of the main assembly of an extensometer according to the present invention.
Figure 2:
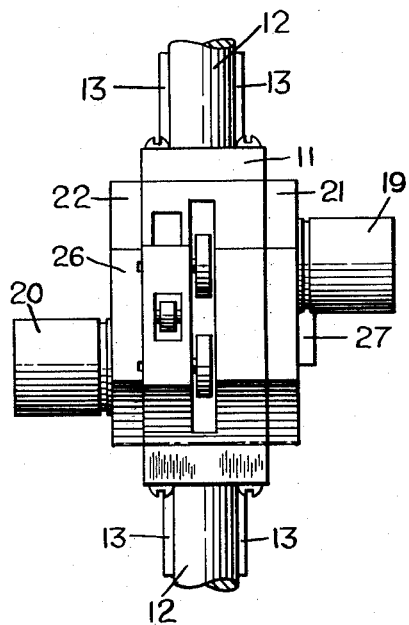
FIGURE 2 is an end view of FIGURE 1 from the rolling contact side of the extensometer.
Figure 3:
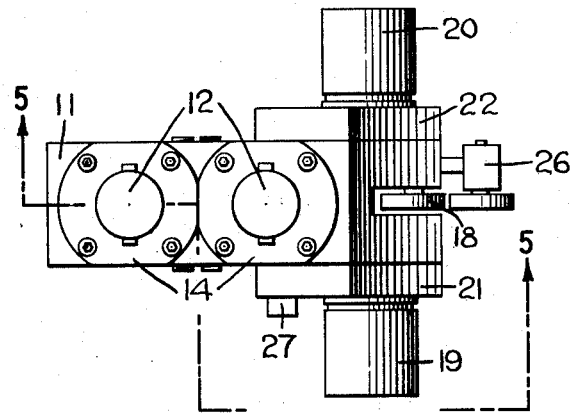
FIGURE 3 is a bottom view of FIGURE 1.
Figure 4:
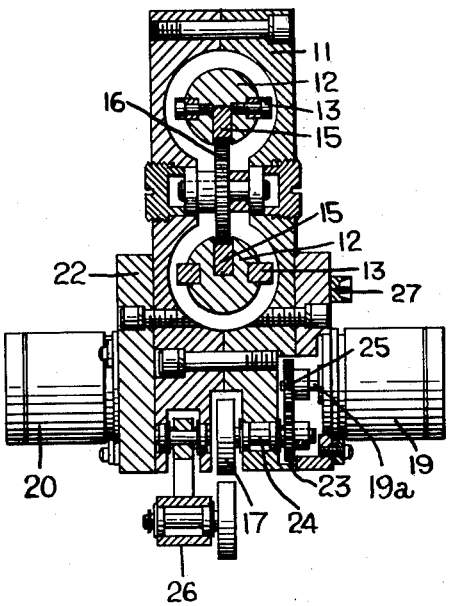
FIGURE 4 is a sectional view through FIGURE 1, taken along line 4—4.
Figure 5:
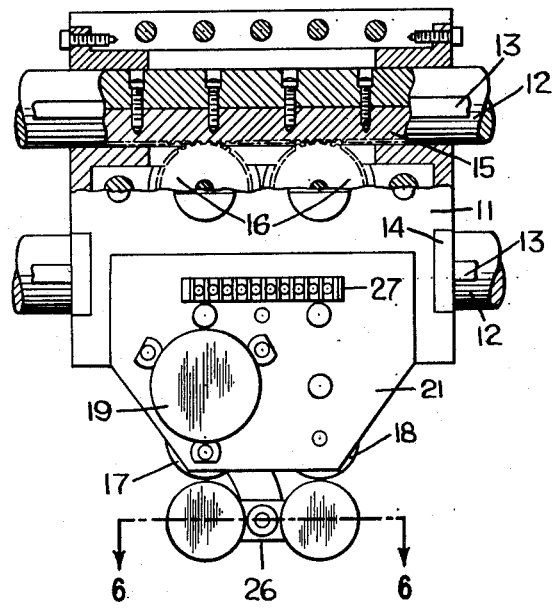
FIGURE 5 is a partially sectional view through FIGURE 3, taken along line 5—5.
Figure 6:
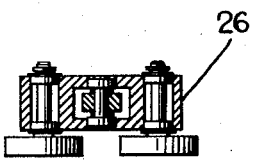
FIGURE 6 is a sectional view through a portion of FIGURE 5, taken along line 6—6.

In the embodiment of the drawings, a two-piece split main frame 11 is assembled on a pair of positioning shafts 12. Each positioning shaft 12 has affixed thereto, in longitudinally parallel relationship, a pair of positioning shaft guide keys 13, which engage slotted portions in positioning shaft bushings 14 to prevent rotational movement of the positioning shafts with respect to the extensometer main frame. Positioning shaft bushings 14 are in turn key-fitted and secured to the assembled main frame. Each positioning shaft contains a longitudinal milled recess fitted with a gear track 15. Positioning shafts 12 are arranged with the gear tracks 15 in opposed facing relationship to engage positioning gears 16 rotatably mounted between the assembled portions of the main frame 11. In operation, the distal ends of positioning shafts 12 are fixed respectively to fixed and moving crosshead portions of a tensile testing machine.

Figure 8:
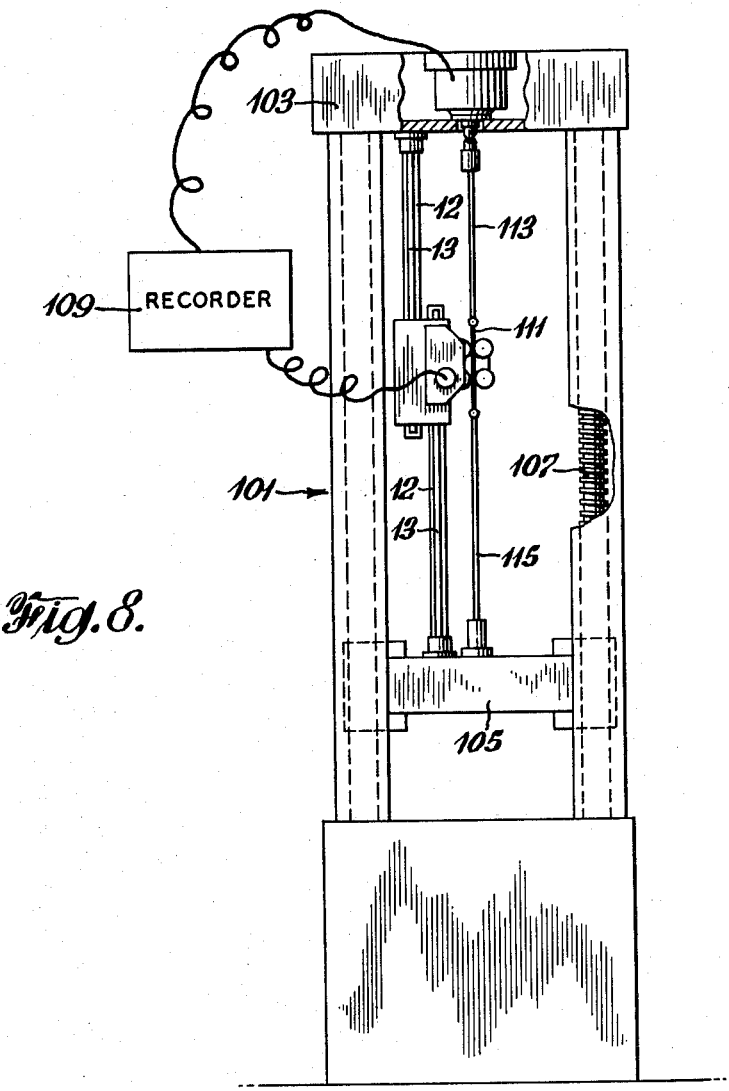
FIGURE 8 is an elevational view of apparatus according to the present invention installed in a conventional tensile testing machine.

FIGURE 8 of the drawings illustrates the manner in which apparatus according to the present invention is installed in a conventional tensile testing machine 101. The machine 101 comprises a fixed frame 103, a moveable portion 105, adapted to move reciprocally on the fixed frame on helical screws 107 and controllably driven means for continuously recording load data, recorder 109.

A material specimen 111 is mounted between holding rods 113 and 115 which are attached respectively to the fixed frame and the moveable crosshead portions of the tensile testing machine and the extensometer similarly mounted with its rollers disposed to contact the specimen 111. As the moving crosshead portion of the testing machine moves away from the fixed portion, the relative motion of the positioning shafts 12 and the positioning gears 16, causes the main frame assembly of the extensometer to follow the movement of the moving crosshead at one-half the crosshead velocity. Thus, during each test, the extensometer is continuously repositioned to maintain its initial position relative to the sample undergoing elongation. In this manner, the extensometer measuring wheels are maintained in correct relationship to that portion of the sample originally contacted and elongation effects in portions of the sample other than the original unit length chosen, are not sensed by the extensometer rollers. Greatly increased accuracy of strain measurement results from this novel differential movement of the extensometer.

The elongation sensing portion of the extensometer comprises upper sensing roller 17 and lower sensing roller 18, both rotatably mounted in the main frame assembly but with partial peripheral projections extending therefrom to tangentially contact the specimen undergoing test, electrical servomechanism transmitter unit 19 and electrical servomechanism differential unit 20, mounted respectively on side mounting plates 21 and 22 which are in turn secured to the respective portions of main frame 11. Upper sensing roller 17 and its associated spur gear 23 are fixedly attached to a common shaft 24, rotatably mounted in frame 11. Spur gear 23 meshes with spur gear 25 which is fixedly attached to the rotor shaft 19a of an electrical servomechanism transmitter unit 19. Thus, for each rotational movement of upper sensing roller 17 there is a corresponding movement of rotor 19a of the servomechanism unit 19. In a similar manner and through similar means, lower sensing roller 18 is operably connected to the rotor 20a of servomechanism differential unit 20. Idler roller assembly 26, with rollers thereon respectively disposed in opposed relationship to upper elongation sensing roller 17 and lower elongation sensing roller 18, is pivotally suspended from the main frame to provide contact maintaining pressure between the sample undergoing test and the elongation sensing rollers. A multi-position electrical connection terminal strip 27, to accommodate the servomechanism wiring, is mounted on side mounting plate 21.

The main frame and all components contiguous thereto are assembled with various types of machine screws. All rotatable components are mounted in conventional precision ball bearings.

Figure 7:
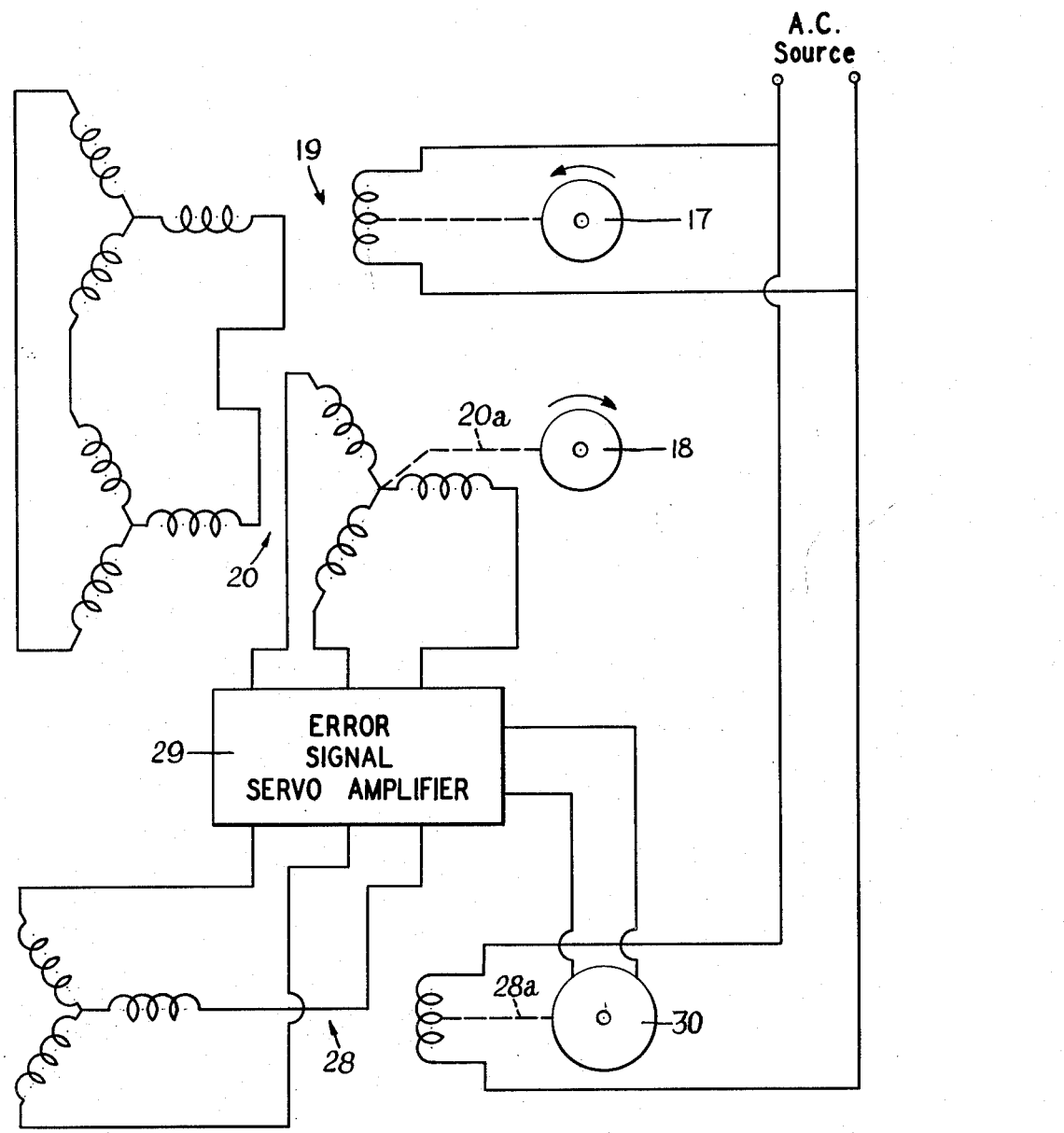
FIGURE 7 is a schematic diagram of the electrical servomechanism system of the extensometer.

External to the main frame portion of the extensometer, and shown only diagrammatically in FIGURE 7, a distal portion for the preferred embodiment of the present invention comprises a second electrical servomechanism transmitter unit 28 and an electrical servomechanism error signal amplifier 29 having an output adapted to control the speed of the recorder chart drive motor 30. The electrical servomechanism transmitter and differential units as well as the error signal amplifier are available commercially.

A schematic diagram of the invention is shown in FIGURE 7 of the drawings. While the operation of the electrical servomechanism closed loop system will be readily comprehended from the drawing by those skilled in the art, a brief description of the operation will facilitate understanding.

The rotor windings of the two servomechanism transmitter units are excited from a common source of single phase constant voltage, constant frequency alternating current. Rotation of upper elongation sensing roller 17, caused by elongation of the sample being tested is accompanied by a corresponding movement of the rotor winding of the first servomechanism transmitter unit 19. The alternating voltage of the rotor winding produces three alternating output voltages in the stator windings which change with rotor movement. The respective peak values and polarities of these three voltages uniquely represent and identify the angular position of the rotor and associated sensing roller 17. The differential unit stator is excited by the output voltages of the first transmitter unit. Rotation of lower sensing roller 18, caused by elongation of the sample being tested, is accompanied by a corresponding movement of the rotor winding of the differential unit 20. The rotor windings of the differential unit have induced therein three alternating voltages, the respective phase polarities and peak values of which identify an angular position which is the algebraic sum of the angular positions of the two sensing rollers coupled to the servomechanism rotors.

The rotor 28a of second servomechanism transmitter unit 28 is driven by the recorder chart drive motor 30. The voltages induced in the stator windings of the second unit are representative of an angular position of the chart drive motor shaft and, consequently of a chart abscissa value. The voltage outputs from the stator of the second transmitter unit and the rotor of the differential unit are connected, in opposed relationship, to the input terminals of the error signal amplifier 29. As long as the recorder chart speed corresponds to the straining velocity of the specimen undergoing elongation, the voltages connected in opposed relationship will be respectively equal and will cancel each other, producing zero net error signal. As soon as the chart drive speed drifts from the velocity corresponding to the specimen straining rate, however, a potential difference or error signal appears between the input connections from the stator of the second transmitter unit and the rotor of the differential unit. This error signal, detected and amplified by the error signal amplifier is applied to the chart drive motor to correct the velocity drift and bring the chart speed back into correspondence with the elongation velocity.

As the abscissa motion of the recording chart proceeds in correspondence with the samples straining rate, the ordinate values representing stress are continuously plotted by the recorder marker means which is operably connected to the load sensing means of the testing machine. The result is an accurately constructed stress-strain diagram for the sample tested.

The present invention provides a means for accurately testing the tensile properties of elastomeric materials such as rubbers, plastics and the like, without inducing biaxial stresses or other data-contaminating effects in the material specimen under test. By its differential motion feature, the extensometer of the instant invention obviates errors introduced by relative creep motion between the test specimen and the strain measuring means. In addition, through the utilization of a closed loop electrical servo system to control recorder chart drive, the present invention automatically correlates the sensed strain data with the sensed load data and produces a complete stress-strain diagram from which the elastic limit, yield point, modulus of elasticity and other physical characteristics of the tested material may be readily determined. The combination of ball bearing mounted rotatable components with inherently low inertia electrical servo units yields practically friction-free translation of the actual elongation into a corresponding electrical signal, a result which has long been sought in the art prior to the present invention.

What is claimed is:
1. For use with a materials load testing machine having a fixed frame, a moveable portion adapted to move reciprocally on said fixed frame and controllably driven means for continuously recording load data, an extensometer comprising, in combination, a body; a pair of spaced measuring rollers rotatably mounted in said body arranged to tangentially contact a material specimen undergoing test; a first electrical servo generator unit; gear means operably connecting respective shafts of said first electrical servo generator unit; and a first roller of said pair of rollers; an electrical servo differential unit; further gear means operably connecting respective shafts of said electrical servo differential unit and a second roller of said pair of rollers; circuit means connecting said electrical servo differential unit and said first electrical servo generator unit; a second electrical servo generator unit rotatably driven by said controllably driven means for continuously recording load data; an electrical servo error signal amplifier adapted to sum opposed phase signals from said electrical servo differential unit and said second electrical servo generator unit and apply a control signal proportional to such sum to said controllably driven means for continuously recording load data; and further circuit means connecting said electrical servo error signal amplifier with said electrical servo differential unit, said second electrical servo generator unit and said controllably driven means for continuously recording load data.

2. Apparatus according to claim 1 in combination with an extensometer vertical positioning pinion gear rotatably mounted in said body of said extensometer and a pair of elongate gear racks respectively connectable to the fixed frame and the moveable portion of said materials load testing machine and arranged with gear teeth portions thereon in opposed facing relationship respectively meshed with said pinion gear.

3. Apparatus according to claim 1 in combination with an extensometer vertical positioning first rack and pinion and second rack and pinion assemblies, said first rack and pinion assembly and said second rack and pinion assembly being arranged in a single plane extending transversely to the rotational axes of the pinions thereof, both said pinions being mounted rotatably in said body of said extensometer and meshed respectively with both said racks, the rack of said first assembly having an end adapted for connection to the fixed frame of said materials load testing machine and the rack of said second assembly having an end adapted for connection to the moveable portion of said materials load testing machine.

4. For use with a materials load testing machine having a fixed frame, a moveable portion adapted to move reciprocally on said fixed frame and controllably driven means for continuously recording load data, an extensometer comprising, in combination, a body; a pair of spaced measuring rollers rotatably mounted in said body arranged to tangentially contact a material specimen undergoing test; a first electrical servo generator unit having a stator winding, a rotor winding in circuit with a source of electrical potential and a rotor rotatably driven by a first roller of said pair of rollers; an electrical servo differential unit having a stator winding in circuit with the stator winding of said first electrical servo generator unit, a rotor winding and a rotor rotatably driven by a second roller of said pair of rollers; a second electrical servo generator unit having a stator winding, a rotor winding in circuit with said source of electrical potential and a rotor rotatably driven by said controllably driven means for continuously recording load data; an electrical servo error signal amplifier adapted to sum opposed phase voltage signals from said electrical servo differential unit and said second electrical servo generator unit and apply a control signal proportional to such sum to said controllably driven means for continuously recording load data; and circuit means connecting said electrical servo error signal amplifier with the rotor winding of said electrical servo differential unit, the stator winding of said second electrical servo generator unit and said controllably driven means for continuously recording load data.

References Cited in the file of this patent

UNITED STATES PATENTS

| | | |
|---|---|---|
| 2,650,432 | Adams | Sept. 1, 1953 |
| 2,756,590 | Clifford et al. | July 31, 1956 |
| 2,857,758 | Snyder | Oct. 28, 1958 |
| 2,889,706 | Huyser | June 9, 1959 |